July 21, 1953
P. W. HOVEY
2,646,135
DISK BRAKE
Filed June 11, 1949
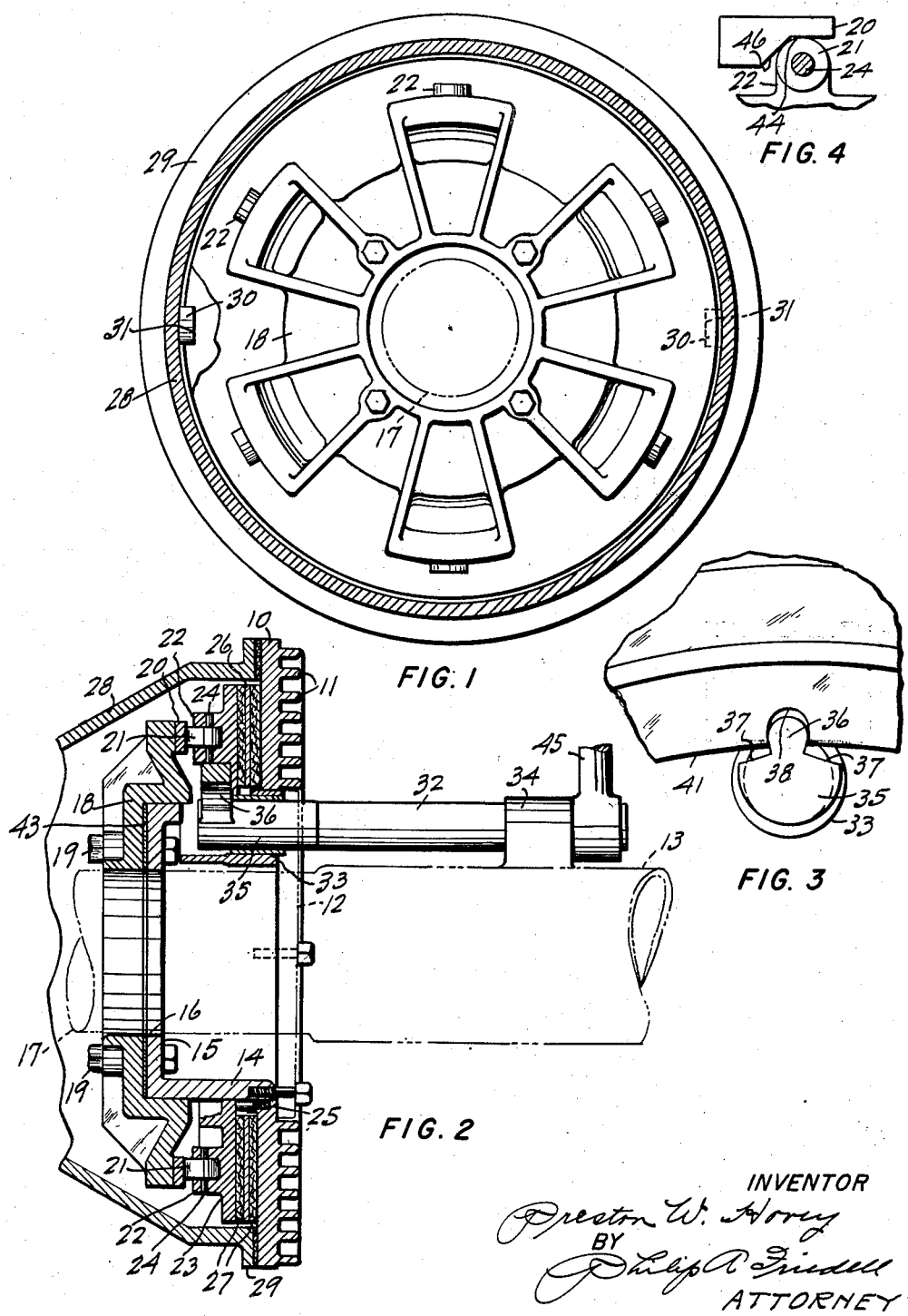
INVENTOR
Preston W. Hovey
BY
Philip A. Friedell
ATTORNEY Patented July 21, 1953

2,646,135

UNITED STATES PATENT OFFICE 2,646,135

DISK BRAKE

Preston William Hovey, Berkeley, Calif.

Application June 11, 1949, Serial No. 98,577

4 Claims. (Cl. 188—72)

This invention relates to improvements in brakes, and particularly relates to disc brakes for automotive vehicles and in which a friction disc rotates with the wheel and is gripped for braking between two members which are relatively fixed against movement relative to the vehicle.

Disc brakes as commercially known are operated for braking through relative rotation of a thrust member and a backing member, the thrust member being conventionally rotated through a small arc to force the brake plate into contact with the friction disc through intervening cams. This type of brake is complicated and expensive to manufacture, usually involving an internal gear and pinion for rotative adjustment of the brake plate, and the brake lacks the rigidity and the uniformity of pressure necessary for maximum efficiency.

In my invention the thrust plate and backing plate are fixed against relative movement except for adjustment to compensate for wear, the backing plate being fixed to the axle housing or other part of the vehicle and the thrust plate being fixed to the backing plate, and being only axially adjustable relative to the backing plate. Instead of rotatably adjusting the thrust plate as is customary for creating a braking action, the brake plate is slightly rotatably adjusted through a very simple mechanism requiring no gear or pinion.

In view of the fact that the thrust plate and backing plate are fixed against relative movement, the brake is less complicated, far stronger and more rigid, simpler to operate, and far more economical to produce.

The objects and advantages of the invention are as follows:

First, to provide a disc type brake which is positive in action, has high braking power, and is relatively simple in construction.

Second, to provide a brake as outlined in which the thrust plate is immovably fixed to the backing plate for utmost rigidity and uniformity of thrust on the disc.

Third, to provide a brake as outlined in which the sole movable and adjustable parts consist of the disc and brake plate.

Fourth, to provide a brake as outlined in which the brake plate is adjusted to cause a braking action with the thrust plate positively fixed against relative movement.

Fifth, to provide a brake as outlined with a single tooth member for adjusting the brake plate for causing a braking action.

Sixth, to provide a brake as outlined which is composed of a minimum number of parts, with complete elimination of gears and pinions, and which is of the utmost simplicity in construction and economical to produce.

In describing the invention reference will be had to the accompanying drawings, in which:

Fig. 1 is a front elevation of the invention with the brake cone shown in section and with a portion of the brake plate broken away to show the keying means between the brake disc and the brake cone.

Fig. 2 is a vertical section through the invention as applied to the axle housing of an automotive vehicle.

Fig. 3 is an enlarged fragmentary view showing the brake plate operating and control means.

Fig. 4 is an enlarged view of one of the cam and roller units.

The invention includes a brake head or backing plate 10 which is suitably ribbed as indicated at 11 to dissipate heat and which is axially fixed to a flange 12 on an axle housing 13. This backing plate has a hollow hub 14 projecting forwardly and which terminates at the forward end in an inturned flange 15 having a bore 16 through which the wheel axle 17 freely operates with the axle also being rotatable in the axle housing 13, though not limited to live axles, as the results would be the same with a dead axle in which case the brake backing plate would be fixed to the axle with the vehicle wheel rotating on the axle.

The thrust plate 18 is fixed to the flange 15 on the hub 14 of the backing plate as indicated at 19 so that the backing plate and thrust plate are relatively immovable, and this thrust plate has a circular series of cams 20 on its inside face and which cooperate with the rollers 21 which are rotatably supported in bearings 22 on the brake plate 23 as indicated at 24, so that slight rotation of the brake plate will cause the rollers to ride up the slope of the cam to force the brake plate inward toward the brake disc; the brake plate being rotatable and slidable on the outside of the hub 14, and being urged away from the disc by spring-loaded plungers 25.

The brake disc 26 is faced on both sides with friction shoes 27 and clears the hub 14 for free running and is supported by the brake cone 28 and which has a flange 29 projecting to the periphery of the backing plate; this cone having a plurality of keys 30 projecting inwardly into keyways 31 formed in the periphery of the disc, whereby the cone drives the disc, and the disc is axially movable but non-rotatable relative to the cone and rotatable relative to the backing plate and thrust plate.

The control means for the brake consists of a shaft 32 which is journaled at its forward end in a bearing 33 which is formed integral with and inside of the hub 14, with the other end journaled in a bearing 34 integral with or mounted on the axle housing 13 in the case of a live axle, and on the axle itself in the case of a dead axle.

This shaft terminates at its forward end in an enlargement 35 in one side of which is formed a single tooth member 36 having a semi-circular top and convergent root, with the enlargement relieved on both sides to form shoulders as indicated at 37 to permit oscillation clearance to form shoulders, and this tooth member operates in a recess 38 with the bottom formed semi-circular and the sides parallel in the inner periphery of the bore 41 of the brake plate 23, and is limited as to movement by said shoulders which are cooperative with the inner periphery of the bore provided in the brake plate, and as shown in Fig. 3, the limit of movement in each direction is about 15 degrees and must not exceed an eighth turn as the tooth would therebeyond emerge from the recess and free the brake plate.

The operation of the invention is as follows: The brake may be adjusted for wear by any well known means such as the shims 43. When the vehicle is moving, the cone 28 which is fixed to the wheel of the vehicle, rotates with the wheel, and since the brake friction disc 26 with its friction facings is carried by and keyed to the cone for sliding movement, this disc is rotated with the cone and wheel for free travel of the vehicle. The rollers 21 at the same time rest in the low portion 44 of the cams as shown in Fig. 4, the backing plate, brake plate, and thrust plate all remaining stationary.

When the brake is to be applied, the lever 45 is pulled forward or toward the observer facing the drawing, the tooth 36 forces the brake plate clockwise viewing the left hand of Fig. 2, causing the rollers to ride up the slope portion 46 of the cam, forcing the brake plate to engage the friction disc with an intensity proportionate to the force applied to the lever 45, tending to stop rotation of the disc and consequently that of the wheel cone 28, braking the vehicle. When the lever is released, the spring loaded plungers 25 force the brake plate away from the disc, permitting return to free running.

I claim:

1. An automotive vehicle brake comprising; a backing plate having an axial hub terminating in an inturned flange and having an annular friction face exteriorly of said hub, a brake disc having one face cooperative with said friction face and rotatable about said hub, a brake cone having one end encompassing said brake disc and keyed thereto for relative axial movement of the disc and rotation with the cone with the terminal face of said one end rotatably cooperative with said friction face exteriorly of said disc to provide a seal against ingress of foreign matter to the disc, a brake plate cooperative with the other face of said disc, a thrust plate fixedly bolted to said inturned flange, cam means cooperative between said brake plate and said thrust plate, and manually operable remote control means cooperative with said brake plate for rotatable adjustment of the brake for cooperative urgence between said brake plate and thrust plate with intervening brake disc.

2. An automotive vehicle brake comprising a backing plate having an axial hub having a passage therethrough for an axle, and a thrust plate fixedly bolted to the end of said hub, a brake plate and a friction disc each having a bore rotatable on said hub and interposed between said backing plate and thrust plate, cam means cooperative between said brake plate and thrust plate and manually operable control means for rotatably adjusting said brake plate and comprising a substantially semi-circular recess formed in the inner periphery of said brake plate with said manually operable control means comprising a shaft rotatably mounted in the wall of said hub and parallel to the axis of said hub and having a radial enlargement terminating in a semi-circular end to fit in said recess and converging toward the axis of said shaft for clearance when the shaft is oscillated in either direction for rotatably adjusting said brake plate.

3. A friction brake housing unit comprising a backing plate having a friction face, a thrust plate, a hub axially spacing said backing plate and said thrust plate; said backing plate, hub, and thrust plate being bolted together to form a fixed non-adjustable unit; a friction disc and a brake plate interposed between said backing plate and thrust plate and rotatable on said hub, and cam means cooperative between said brake plate and said thrust plate, a wheel cone having one end encompassing said friction disc and keyed thereto for relative axial movement and for mutual rotation, and manually operable remote control means cooperative with said brake plate for adjusting said brake plate rotatably for gripping of said friction disc between said brake plate and said backing plate through the medium of said cam means.

4. A brake for an automotive vehicle comprising, a backing plate having an axial hub projecting from one face thereof with said hub having an axial axle passage, a thrust plate fixedly secured to the projecting end of said hub to form a rigid non-adjustable unit, a wheel cone rotatable relative to said non-adjustable unit and having its base end sealably cooperating with the peripheral portion of the face of said backing plate, a friction disc and a brake plate housed within said cone and interposed between said backing plate and thrust plate and each having an axial bore for rotation on said hub, and a driving connection between said cone and said friction disc, a single tooth-receiving recess formed in one wall of the bore in said brake plate, a bearing formed in said hub parallel to the axis of said hub and a shaft rotatable in said bearing and having a tooth formed laterally at one end for cooperation in said recess, and having an operating lever mounted on the other end, and cam means cooperative between said brake plate and said thrust plate for causing axial movement of said brake plate coincident with rotational movement created through rotational movement of said shaft.

PRESTON WILLIAM HOVEY.

References Cited in the file of this patent

UNITED STATES PATENTS

| Number | Name | Date |
|---|---|---|
| 2,071,107 | Blatt | Feb. 16, 1937 |
| 2,422,713 | Benson | June 24, 1947 |